United States Patent [19]
Otero

[11] Patent Number: 5,855,150
[45] Date of Patent: Jan. 5, 1999

[54] TUBULAR TOOL FOR REMOVING, INSTALLING AND STORING OF AUTO LUG NUTS

[76] Inventor: Armando Otero, 714 W. Virginia Ave., Tampa, Fla. 33603

[21] Appl. No.: 744,745

[22] Filed: Nov. 6, 1996

[51] Int. Cl.[6] .................................................. B25B 13/02
[52] U.S. Cl. ........................... 81/124.1; 81/177.6; 81/125
[58] Field of Search .................................. 81/124.1, 125, 81/177.6, 177.7

[56] References Cited

U.S. PATENT DOCUMENTS

| | | | |
|---|---|---|---|
| 2,465,152 | 3/1949 | Ellison | 81/177.5 X |
| 2,857,794 | 10/1958 | Red | 81/124.1 X |
| 3,416,395 | 12/1968 | Hanson | 81/177.5 X |
| 3,738,768 | 6/1973 | Kuhn | 81/177.6 X |
| 5,685,207 | 11/1997 | Hubert | 81/177.5 |

*Primary Examiner*—James G. Smith

[57] ABSTRACT

A tool for removing, installing and storing of automobile lug nuts having a tubular body with a cavity able to house a plurality of lug nuts from at least one tire. The tool also having a means to retrieve said lug nuts from said tubular body comprising of a piston and pushing mechanism slidably affixed to the tubular body via a threaded rod and a slot. The tubular body having dual handles able to remove lug nuts without the need to remove the hexagonal tip from the lug nuts.

5 Claims, 6 Drawing Sheets

TUBULAR TOOL FOR REMOVING, INSTALLING AND STORING OF AUTO LUG NUTS

BACKGROUND

1. Field of the Invention

Generally, this invention is directed towards removing and storage of automobile lug nuts in an easy and quick fashion. More specifically, this invention relates to a socket tool having an elongated cavity for storage and a unique mechanism for removal of automobile lug nuts.

2. Description of the Prior Art

One of the problems noticed when changing a flat tire is the loss of automobile lug nuts during the process. These automobile lug nuts seem to have the unique ability to find the remotest location to hide from the person changing the tire. Much time and effort can be lost simply trying to find the lug nuts that have been accidently kicked around and lost.

Another problem notice when removing a flat or spare tire from an automobile is the inconvenient position the bottom lug nut tends to become. Lug wrenches need to be substantially long in order to give a person leverage to remove the tight lug nuts on automobiles. The lengthy lug wrenches tend to hit the ground when rotated while removing the lug nuts and thus need to be removed and reinserted onto the lug nuts at different angles to continue. This problem tends to happen frequently for the lug nuts in close proximity to the ground or bottom of the tire rim. This process is lengthy and time consuming especially for people not mechanically inclined.

Several approaches have been provided for the removal of lug nuts, in U.S. Pat. No. 5,129,609, "A socket wrench comprises a socket head having an opening for slidably receiving a nut and flange disposed at an opposite end of the opening and extending inwardly into the opening; a pipe having one end secured to the socket head; and a driver receptor secured to the other end of the pipe. The flange includes a central opening that is smaller than the inside diameter of the pipe and that communicates with the interior of the pipe, thereby permitting an end portion of a long bolt to extend into the interior of the pipe when a nut is screwed down along the bolt."

In U.S. Pat. No. 5,396,819, "A socket wrench has a rotatable cylindrical body with an elongated interior channel for storing a plurality of nuts. The channel has a nut opening at a first end for receiving and removing nuts from the channel. A longitudinally slidably and axially rotatable roller grip assembly is provided on the exterior of the body. The roller grip assembly is attached to an interior backplate that moves longitudinally within the body channel. the roller grip assembly allows an operator both to urge the stored nuts toward the nut opening of the wrench, eject the nuts from the chamber, and to hold the wrench while the body is rotating."

In the art taught by U.S. Pat. No. 3,855,883, "A nut retaining socket wrench device includes a tubular body member having a tool receiving socket at its proximate end and a nut engaging socket at its distal end. An axially movable plunger is coaxially supported within the body member and carries at its distal end a frustoconical resilient plastic plug for releasably engaging the bore of a nut engaged by the distal socket. The plunger is spring biased to position the plug proximate the outer end of the distal socket and is urged inwardly when a nut is tightened on a bolt by the end of the bolt."

While some of the prior art may contain some similarities relating to the present invention, none of them teach, suggest or include all of the advantages and unique features of a socket wrench for quickly removing and storing automobile lug nuts as the invention disclosed herein.

For the foregoing reasons, there is a need for device that can easily remove lower lug nuts and store them in an easy and fashion.

SUMMARY

The present invention is directed towards the removal and storage of automobile lug nuts in a quick and easy fashion. The apparatus includes an elongated socket having a cavity capable of storing up to six lug nuts in an end to end fashion. A retrieving mechanism is used to retrieve the lug nuts from the cavity. A unique dual rotatable handle device is also incorporated into the invention and is used to quickly remove bottom lug nuts from an automobile without having to remove the invention from the lug nut.

Accordingly, it is an object of this invention to provide a socket having an elongated cavity that will allow the storage of automobile lug nuts in an end to end fashion. This will prevent the loss of lug nuts during changing of a flat tire.

Another object of this invention is to provide a dual rotatable handle mechanism that will allow lug nuts to be removed without having to remove and reinsert the lug wrench onto the lug nut. This feature will expedite the process of removal and insertion of the lug nuts.

Other objects and a fuller understanding of the invention will become apparent from reading the following detailed description of a preferred embodiment in conjunction with the accompanying drawings.

BRIEF DESCRIPTION OF THE DRAWINGS

This invention, together with other objects, features, aspects and advantages thereof, will be more clearly understood from the following description, considered in conjunction with the accompanying drawings.

Six sheets of drawings are furnished, sheet one contains FIG. 1, sheet two contains FIG. 2, sheet three contains FIG. 3 and FIG. 4, sheet four contains FIG. 5, sheet five contains FIG. 6, and sheet six contains FIG. 7.

DESCRIPTION OF THE PREFERRED EMBODIMENTS

Figure 1:
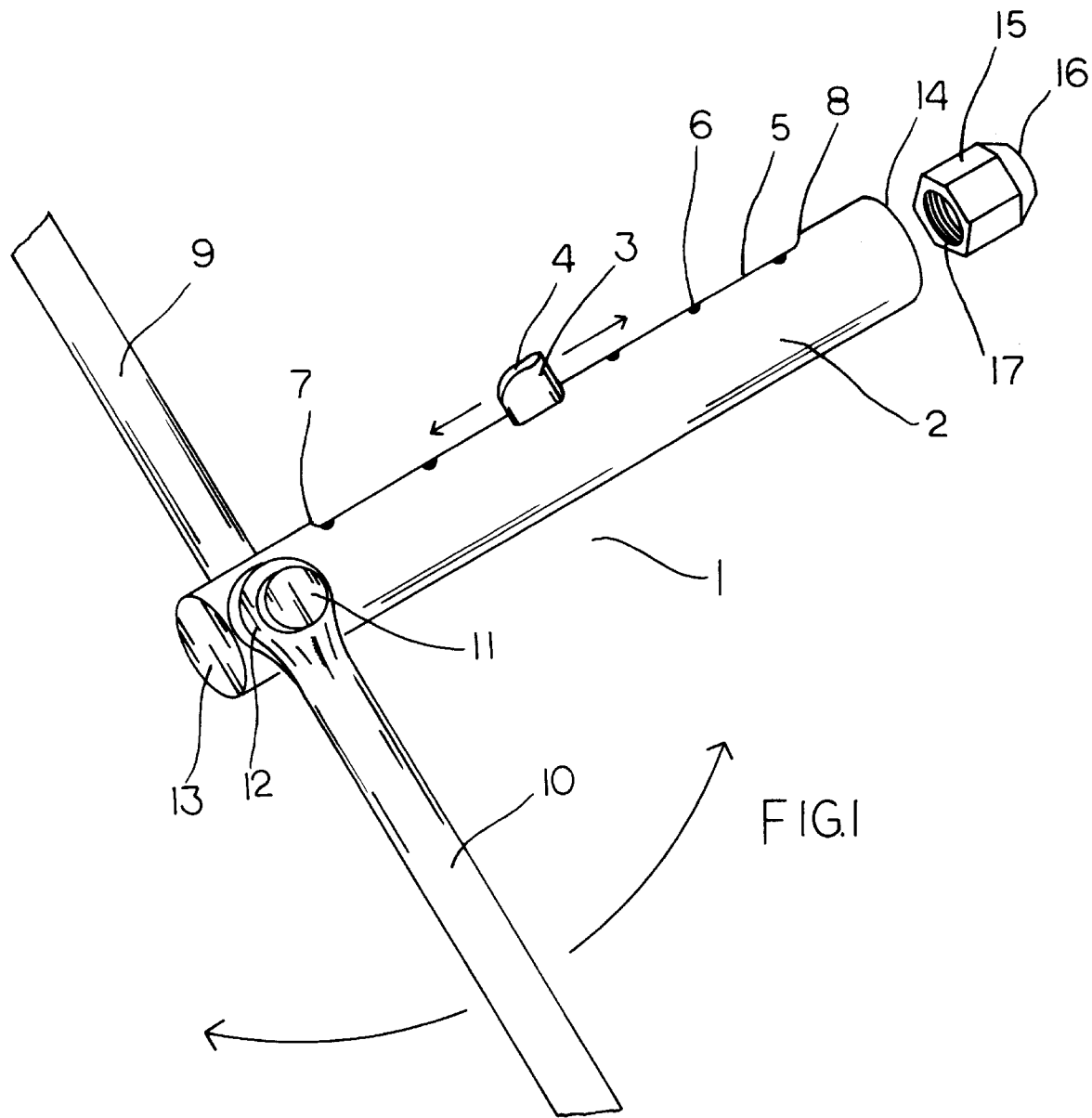
FIG. 1 is an orthographic view of the invention showing the elongated socket for housing a plurality of lug nuts and the unique dual handle mechanism.

Referring now to FIG. 1, an apparatus for storing and removing automobile lug nuts referred to generally by reference numeral 1. The apparatus 1 is made up primarily of an elongated socket 2, a pair of handles 9 and 10 rotatably affixed to the socket 2 at one end 13.

The handles 9 and 10 are rotatably affixed to the socket via a rod having a flange 11 at both ends. It should be noted that this bolt can easily be a threaded rod as with a nut and bolt. Each of the handles 9 and 10 have a flat end 12 with an opening that is inserted over the flanged rod. The handles 9 and 10 can be rotated a full 360 degrees independent of each other as shown with the directional arrows of FIG. 1. At the front end 14 of the socket 2 a lug nut 15 having internal threads 17 and a rounded front end 16 as with typical lug nut is shown ready for insertion into the socket 2.

In FIG. 1, we also see a slot 5 at the top portion of the socket 2 which allows a pushing mechanism 3 with gripping grooves 4 to slide back and forth to the front end 8 of the slot 5 to the back end 7 of the slot 5. Along the edges of the slot are a plurality of grooves 6 spaced apart from each other an equal distance apart. Normally this distance between grooves 6 is equal to the length of a lug nut.

Figure 2:
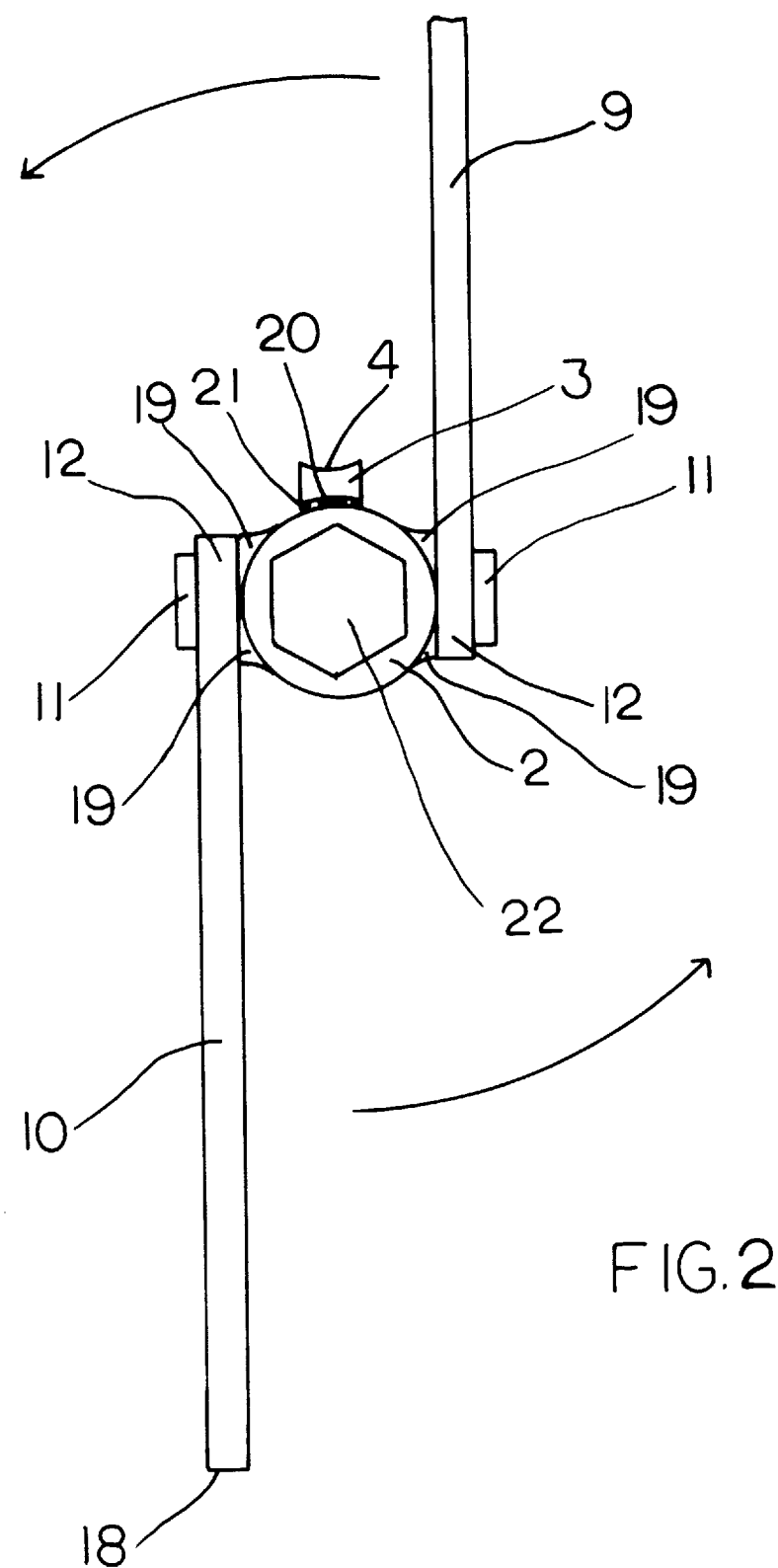
FIG. 2 shows a front view of the invention showing the dual handles, the frontal opening of the socket cavity.

In FIG. 2, we see a flange portion 19 which engages flat end 12 of the handle such that there is more surface area in contact during high torque procedures. A cavity 22 is shown for accepting lug nuts 15, and the cavity normally having a hexagonal shape to engage the lug nuts 15. At one end of the handles is a wedged tip 18 for removal of hub caps.

Figure 3:
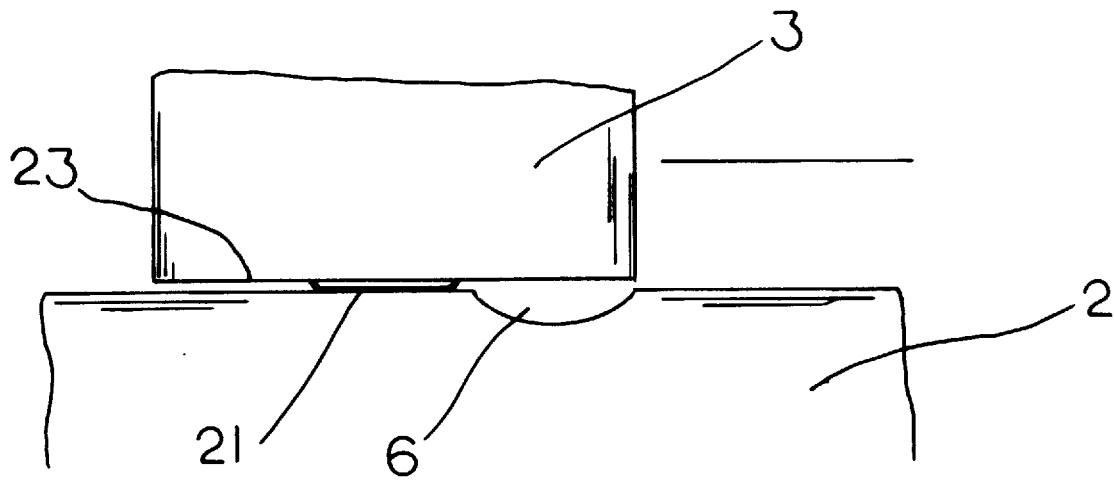
FIG. 3 shows a side view of the snap locking means in which the thumb locking spring is being slid towards a groove.
Figure 4:
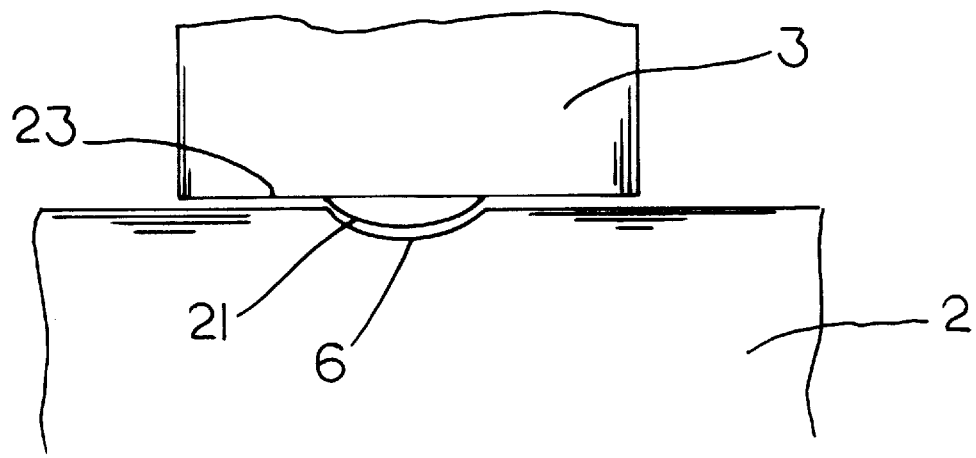
FIG. 4 shows the side view of the snap locking means in which the thumb locking spring is in a locked position.

FIG. 3 and 4 show a spring locking mechanism used to lock the pushing mechanism 3 at discrete distances along the length of the tubular body. A spring 21 is shown in a compressed fashion affixed to the under side 23 of the pushing mechanism 3 because it is not aligned with groove 6. When the spring 21 is aligned with the groove 6, the spring 21 expands into the groove 6 thereby semi-locking the pushing mechanism 3 into a fixed position. The spring 21 is biased to form a convex shape with the groove having a fixed concave shape. The purpose of the spring locking mechanism is to hold the lug nuts 15 at the distal end of the apparatus 2 near the opening 22. This allows for quicker access to the lug nuts 15 that are stored inside of the socket 2.

Figure 5:
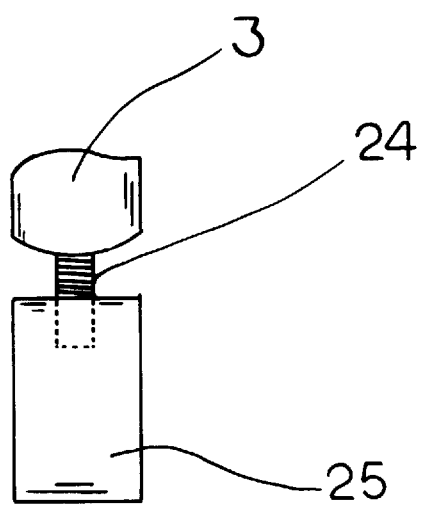
FIG. 5 shows a side view of the thumb grip attached to the lug nut removal mechanism via a threaded screw.

FIG. 5 shows the pushing mechanism 3 affixed to the lug nut pushing mechanism 25 via a threaded rod 24. The pushing mechanism 25 is normally in the shape of the cavity 22 of the socket 2, however, other shapes are possible as well.

Figure 6:
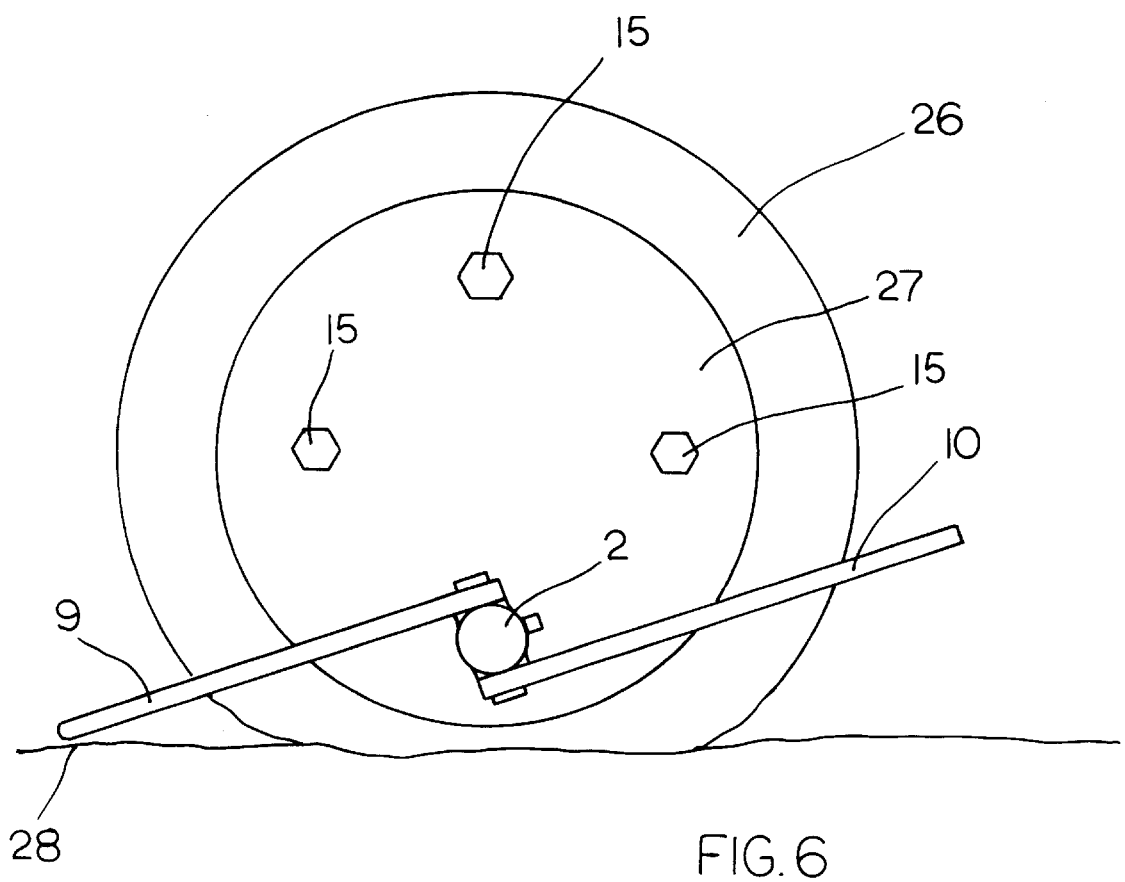
FIG. 6 shows a side view of the elongated handle coming in contact with the ground surface during removal of one of the bottom lug nuts.
Figure 7:
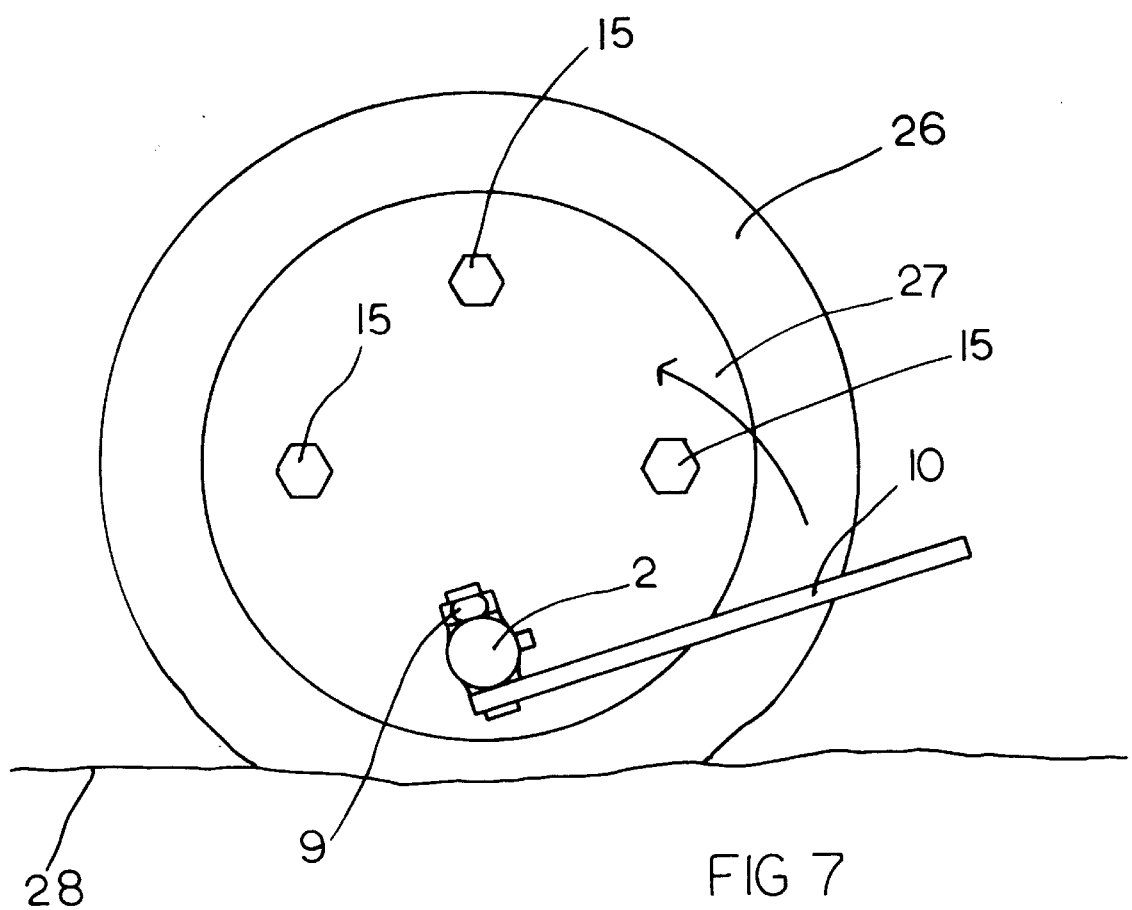
FIG. 7 shows a side view of the elongated handle rotated along the length wise axis of the socket to allow further rotation of the socket without removal from the lug nut.

In FIG. 6 and 7, we see a method in which the dual handle mechanism is used to expedite the process of removal and insertion of lug nut 15 from an automobile rim 27 having a flat tire 26. FIG. 6 shows handle 9 in contact with the ground 28 when the handle 9 is in a perpendicular position relative to the lengthwise axis of the socket 2 thereby preventing further. In FIG. 6, conventional lug wrenches are not able to turn anymore without removal and reinsertion of the lug wrench onto the lug nuts 15. However, with the present invention, the handle 9 is simply rotated and aligned parallel to the lengthwise axis of the socket 2 as in FIG. 7 and handle 10 is further rotated until contact is made with the ground 28 again. The procedure is simply repeated until the lug nut 15 is removed.

In carrying out this invention in the illustrative embodiment thereof, a person simply inserts the hexagonal opening 22 onto the lug nuts 15. The handles 9 and 10 are then rotated until they are aligned substantially perpendicular to the lengthwise axis of the socket 2. Once the lug nut 15 is completely removed, without removing the lug nut 15 from the cavity 22, the opening 22 is inserted over the next lug nut 15 thereby pushing the first lug nut deeper into the cavity 22. A click should be heard by locking spring mechanism everytime an additional lug nut 15 is inserted into cavity 22.

To install the lug nuts 15 onto the rim, the socket containing lug nuts 15 is simply aligned and rotated onto the rim of the car and rotated until the lug nut 15 is secured to the rim. The pushing mechanism 3 is then pressed forward to move the internal lug nuts 15 towards the front of the socket 2 to install the next lug nut 15. Accordingly, a very unique, attractive, and convenient apparatus are provided for storage and removal of lug nuts 15 from and auto mobile.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A tool for removing, installing and storing automobile lug nuts comprising:

(a) an elongated tubular body having a hollow cavity, said body having at least one open end that extends into said cavity, said cavity having a diameter that is able to accept said lug nuts and having a length able to store a plurality of said nuts in an end to end fashion, said open end having a hexagonal shape to engage said lug nuts, said body having a slot parallel to a longitudinal axis of said body, said slot extending into said cavity, said body having at least one protruding flange affixed to said body at an end opposite said one end, said at least one flange having a flat, round surface;

(b) a means for pushing said lug nuts from said cavity through said open end, said means comprising a pushing mechanism and a piston slidable on said body and interconnected by a threaded rod slidable in said slot, said piston able to push said lug nuts out of said body;

(c) two handles rotatably attached at one end to said body, at least one of said handles having a wedge tip at an end opposite to said one end of said at least one handle, said one end of said handles having a flat, round face engaging said flat, round surface of said at least one flange;

(d) a means of gauging the number of nuts within said body comprising a plurality of grooves adjacent to said slot on an outer surface of said body, the grooves are spaced an equal distance apart along the longitudinal axis, said distance is equal to a height of a lug nut.

2. A tool for removing, installing and storing automobile lug nuts comprising:

(a) an elongated tubular body having a hollow cavity, said body having at least one open end that extends into said cavity, said cavity having a diameter that is able to accept said lug nuts and having a length able to store a plurality of said nuts in an end to end fashion, said open end having a hexagonal shape to engage said lug nuts, said body having a slot parallel to a longitudinal axis of said body, said slot extending into said cavity;

(b) a means for pushing said lug nuts from said cavity through said open end, said means comprising a pushing mechanism and a piston slidable on said body and interconnected by a threaded rod slidable in said slot, said piston able to push said lug nuts out of said body;

(c) at least one handle rotatably attached at one end to said body;

(d) a means for gauging the number of nuts within said body comprising a plurality of grooves adjacent to said slot on an outer surface of said body, the grooves are spaced an equal distance apart along the longitudinal axis, said distance is equal to a height of a lug nut.

3. A tool as set forth in claim 2 wherein said body further having a pair of protruding flanges at an end opposite to said one end, each said flange having a flat, round surface, said at least one handle having a flat, round face engaging said flat, round surface.

4. A tool as set forth in claim 2 wherein a distance between said opening and a first groove is equal to a height of a lug nut, each groove having a substantially concave shape, a spring attached to a bottom side of said pushing mechanism having a convex shape mating with said concave shape of said groove.

5. A tool as set forth in claim 2 further comprising said at least one handle having a wedge tip at an end opposite to said one end of said at least one handle.

* * * * *